United States Patent
Yamada et al.

(10) Patent No.: US 10,000,211 B2
(45) Date of Patent: Jun. 19, 2018

(54) VEHICLE TRAVEL CONTROL APPARATUS

(71) Applicant: TOYOTA JIDOSHA KABUSHIKI KAISHA, Toyota-shi (JP)

(72) Inventors: Hiroshi Yamada, Nisshin (JP); Takeshi Nanami, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 14/915,839

(22) PCT Filed: Aug. 27, 2014

(86) PCT No.: PCT/JP2014/073114
§ 371 (c)(1),
(2) Date: Mar. 1, 2016

(87) PCT Pub. No.: WO2015/033943
PCT Pub. Date: Mar. 12, 2015

(65) Prior Publication Data
US 2016/0200321 A1    Jul. 14, 2016

(30) Foreign Application Priority Data
Sep. 6, 2013  (JP) ................................. 2013-185685

(51) Int. Cl.
*B60W 30/14* (2006.01)
*B60W 10/06* (2006.01)
(Continued)

(52) U.S. Cl.
CPC ............ *B60W 30/14* (2013.01); *B60W 10/06* (2013.01); *B60W 10/18* (2013.01); *G05D 1/021* (2013.01);
(Continued)

(58) Field of Classification Search
None
See application file for complete search history.

(56) References Cited

U.S. PATENT DOCUMENTS 5,400,864 A * 3/1995 Winner ................. B60W 30/16
701/96
5,710,565 A * 1/1998 Shirai ................... B60W 30/16
340/903

(Continued)

FOREIGN PATENT DOCUMENTS

DE         19821122 A1 * 6/1999 ......... B60K 31/0008
DE         100 07 501 A1    9/2001
(Continued)

OTHER PUBLICATIONS

International Search Report and Written Opinion dated Jan. 20, 2015 in PCT/JP14/073114 Filed Aug. 27, 2014.

*Primary Examiner* — John Olszewski
*Assistant Examiner* — David P. Merlino
(74) *Attorney, Agent, or Firm* — Oblon, McClelland, Maier & Neustadt, L.L.P.

(57) ABSTRACT

A vehicle travel control apparatus for improved vehicle following includes a sensor that obtains preceding vehicle speed information representing a vehicle speed of a preceding vehicle, and preceding vehicle information representing at least one of a lateral position and a lateral speed of the preceding vehicle with respect to a traveling direction of a host vehicle, and a controller that, during a following mode in which the host vehicle follows the preceding vehicle, determines a target value related to acceleration/deceleration of the host vehicle based on the preceding vehicle speed information such that the host vehicle follows the preceding vehicle, and controls the acceleration/deceleration of the host vehicle such that the target value is implemented. During the following mode, the controller corrects the target (Continued)

value related to the acceleration/deceleration of the host vehicle based on the preceding vehicle information.

7 Claims, 6 Drawing Sheets

(51) Int. Cl.
*B60W 10/18* (2012.01)
*G05D 1/02* (2006.01)
*B60W 30/16* (2012.01)

(52) U.S. Cl.
CPC ......... *B60W 30/16* (2013.01); *B60W 2540/10* (2013.01); *B60W 2550/30* (2013.01); *B60W 2550/302* (2013.01); *B60W 2550/304* (2013.01); *B60W 2720/106* (2013.01); *B60W 2750/30* (2013.01)

(56) References Cited

U.S. PATENT DOCUMENTS

| | | | | |
|---|---|---|---|---|
| 6,282,483 | B1* | 8/2001 | Yano | B60K 31/0008 701/96 |
| 8,370,042 | B2* | 2/2013 | Tokimasa | B60W 10/06 701/94 |
| 2002/0021229 | A1 | 2/2002 | Stein | |
| 2003/0218564 | A1* | 11/2003 | Tamatsu | G01S 7/414 700/301 |
| 2006/0217866 | A1* | 9/2006 | Moebus | B60K 31/0008 701/93 |
| 2009/0048755 | A1 | 2/2009 | Tokimasa et al. | |
| 2009/0157314 | A1* | 6/2009 | Jordan | B60W 40/04 701/300 |
| 2009/0164083 | A1* | 6/2009 | Thiel | B60W 30/143 701/96 |
| 2010/0036578 | A1* | 2/2010 | Taguchi | B60W 30/143 701/93 |
| 2011/0282559 | A1* | 11/2011 | Isaji | B60W 30/16 701/96 |
| 2014/0005908 | A1* | 1/2014 | Kollberg | B60W 30/16 701/96 |
| 2014/0114548 | A1* | 4/2014 | Kagerer | B60W 30/16 701/96 |

FOREIGN PATENT DOCUMENTS

| | | | | |
|---|---|---|---|---|
| DE | 10205225 A1 | * | 11/2003 | ......... B60K 31/0008 |
| DE | 103 07 169 A1 | | 9/2004 | |
| DE | 10 2010 056 248 A1 | | 6/2012 | |
| JP | 11-48825 A | | 2/1999 | |
| JP | 2001-18680 A | | 1/2001 | |
| JP | 2001-191815 A | | 7/2001 | |
| JP | 2006-44445 A | | 2/2006 | |
| JP | 2007-62711 A | | 3/2007 | |
| JP | 2009-18681 A | | 1/2009 | |
| JP | 2010-158924 A | | 7/2010 | |
| JP | 2011-195122 A | | 10/2011 | |
| WO | WO 9930920 A1 | * | 6/1999 | ......... B60K 31/0008 |

* cited by examiner

| LATERAL SPEED IN LEAVING DIRECTION | LATERAL POSITION OF PRECEDING VEHICLE | | |
|---|---|---|---|
| | FIRST REGION | SECOND REGION | THIRD REGION |
| HIGH | 0 | MIDDLE | HIGH |
| LOW | 0 | LOW | MIDDLE |

| LATERAL SPEED IN LEAVING DIRECTION | OPERATION STATE OF DRIVER | PRECEDING VEHICLE LATERAL POSITION [m] | | | | |
|---|---|---|---|---|---|---|
| | | THIRD REGION (LEFT) | SECOND REGION (LEFT) | FIRST REGION | SECOND REGION (RIGHT) | THIRD REGION (RIGHT) |
| HIGH | LEFT WINKER = ON | NULL (IMMEDIATE CANCELLATION) | NULL (IMMEDIATE CANCELLATION) | NULL (IMMEDIATE CANCELLATION) | MIDDLE | HIGH |
| HIGH | RIGHT WINKER = ON | HIGH | MIDDLE | NULL (IMMEDIATE CANCELLATION) | NULL (IMMEDIATE CANCELLATION) | NULL (IMMEDIATE CANCELLATION) |
| HIGH | WINKER = OFF AND STATE IMMEDIATELY AFTER OVERRIDE EVENT | HIGH | MIDDLE | NULL (IMMEDIATE CANCELLATION) | MIDDLE | HIGH |
| HIGH | OTHER THAN FOREGOING | MIDDLE | LOW | NULL (IMMEDIATE CANCELLATION) | LOW | MIDDLE |
| LOW | LEFT WINKER = ON | NULL (IMMEDIATE CANCELLATION) | NULL (IMMEDIATE CANCELLATION) | NULL (IMMEDIATE CANCELLATION) | LOW | MIDDLE |
| LOW | RIGHT WINKER = ON | MIDDLE | LOW | NULL (IMMEDIATE CANCELLATION) | NULL (IMMEDIATE CANCELLATION) | NULL (IMMEDIATE CANCELLATION) |
| LOW | WINKER = OFF AND STATE IMMEDIATELY AFTER OVERRIDE EVENT | LOW | 0 | NULL (IMMEDIATE CANCELLATION) | 0 | LOW |
| LOW | OTHER THAN FOREGOING | 0 | 0 | NULL (IMMEDIATE CANCELLATION) | 0 | 0 |

FIG.9

VEHICLE TRAVEL CONTROL APPARATUS

TECHNICAL FIELD

The disclosure is related to a vehicle travel control apparatus.

BACKGROUND ART

Such a vehicle travel control apparatus is known in which a particular braking apparatus is not operated for a predetermined period immediately after a mode is changed from an ordinary traveling mode in which acceleration/deceleration is controlled based on operations of a driver to an autonomous traveling mode even when a vehicle speed control content based on a relationship with respect to a preceding vehicle is deceleration control (see Patent Document 1, for example). Further, according to the vehicle travel control apparatus, the particular braking apparatus is operated even within the predetermined period if an inter-vehicle distance with respect to the preceding vehicle becomes shorter than a predetermined distance.

[Patent Document 1] Japanese Laid-open Patent Publication No. 2001-18680

DISCLOSURE OF INVENTION

Problem to be Solved by Invention

According to the Patent Document 1, it is determined whether it is necessary to operate the braking apparatus based on the inter-vehicle distance with respect to the preceding vehicle immediately after the mode change from the ordinary traveling mode to the autonomous traveling mode. However, according to such a configuration in which only the inter-vehicle distance, which is a positional relationship in the back-and-forth direction with respect to the preceding vehicle, is considered, there may be such situations where the braking apparatus is not operated when it is better to operate, the braking apparatus is operated when it is not appropriate to operate, etc. Such situations may occur not only immediately after the mode change from the ordinary traveling mode to the autonomous traveling mode but also during the autonomous traveling mode.

Therefore, an object of this disclosure is to provide a vehicle travel control apparatus that can implement deceleration of a host vehicle considering a lateral relationship between the host vehicle and a preceding vehicle.

Means to Solve the Problem

According to one aspect of the disclosure, a vehicle travel control apparatus is provided, which includes:
a sensor that obtains preceding vehicle speed information representing a vehicle speed of a preceding vehicle, and preceding vehicle information representing at least one of a lateral position and a lateral speed of the preceding vehicle with respect to a traveling direction of a host vehicle; and
a controller that, during a following mode in which the host vehicle follows the preceding vehicle, determines a target value related to acceleration/deceleration of the host vehicle based on the preceding vehicle speed information such that the host vehicle follows the preceding vehicle, and controls the acceleration/deceleration of the host vehicle such that the target value is implemented, wherein during the following mode, the controller corrects the target value related to the acceleration/deceleration of the host vehicle based on the preceding vehicle information.

Advantage of the Invention

According to one aspect of the disclosure, a vehicle travel control apparatus can be obtained which can implement deceleration of a host vehicle considering a lateral relationship between the host vehicle and a preceding vehicle.

DESCRIPTION OF REFERENCE SYMBOLS

10 vehicle control ECU
16 forward radar sensor
100 vehicle travel control apparatus

BEST MODE FOR CARRYING OUT THE INVENTION

In the following, embodiments are described in detail with reference to appended drawings.

Figure 1:
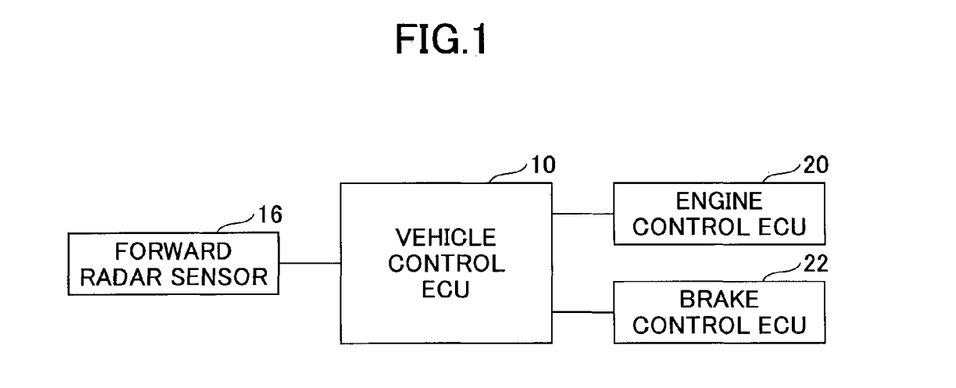
FIG. 1 is a diagram for schematically illustrating a configuration of a vehicle travel control apparatus 100 according to an embodiment.

FIG. 1 is a diagram for schematically illustrating a configuration of a vehicle travel control apparatus 100 according to an embodiment. The vehicle travel control apparatus 100 includes a vehicle control ECU (Electronic Control Unit) 10. The vehicle control ECU 10 may be formed by a processor that includes a CPU. Functions of the vehicle control ECU 10 (including functions described hereinafter) may be implemented by any hardware, any software, any firmware or any combination thereof. For example, any part of or all the functions of the vehicle control ECU 10 may be implemented by an ASIC (application-specific integrated circuit), a FPGA (Field Programmable. Gate Array) or a DSP (digital signal processor). Further, the vehicle control ECU 10 may be implemented by a plurality of processors.

The vehicle control ECU 10 is connected to a forward radar sensor 16. The forward radar sensor 16 detects a state (preceding vehicle information) of a preceding vehicle in front of a host vehicle using an electromagnetic wave (millimeter wave, for example), a light wave (laser, for example) or an ultrasonic wave as a detection wave. The forward radar sensor 16 detects information which represents a relationship between the preceding vehicle and the host vehicle such as a relative speed, a relative distance and a direction (a lateral position) with respect to the host vehicle, for example, at a predetermined cycle. It is noted that if the forward radar sensor 16 is a millimeter wave radar sensor, the millimeter wave radar sensor may be of an electronic controlled scanning type, for example. In this case, the relative speed of the preceding vehicle is detected using a Doppler frequency (frequency shift) of the electromagnetic wave, the relative distance of the preceding vehicle is detected using a delayed time of the reflection wave, and the direction of the preceding vehicle is detected based on a shift difference of the received waves between a plurality of reception antennas. The preceding vehicle information thus obtained is transmitted to the vehicle control ECU 10 at a predetermined cycle. It is noted that any functions of the forward radar sensor 16 (a function of calculating a position of the preceding vehicle, for example) may be implemented by the vehicle control ECU 10.

An image sensor may be used in addition to or instead of the forward radar sensor 16. The image sensor includes a camera, which includes imaging elements such as CCDs (charge-coupled device), CMOSs (complementary metal oxide semiconductor), etc., and an image processor to recognize the state of the preceding vehicle. The camera of the image sensor may be of a stereo type. The image sensor detects, based on an image recognition result, the information which represents a relationship between the preceding vehicle and the host vehicle such as a relative speed, position information of the preceding vehicle with respect to the host vehicle, for example, at a predetermined cycle. The position information of the preceding vehicle includes information related to the position (distance) of the preceding vehicle in the back-and-forth direction of the host vehicle, and information related to the lateral position of the preceding vehicle in the lateral direction (width direction). The lateral position of the preceding vehicle may be calculated based on a center position of a pixel group related to the preceding vehicle in the lateral direction. Alternatively, the lateral position of the preceding vehicle may be calculated as a range between a left end lateral position and a right end lateral position. The preceding vehicle information thus obtained with the image sensor may be transmitted to the vehicle control ECU 10 at a predetermined cycle. It is noted that the image processing function of the image processor (a function of calculating a position of the preceding vehicle, for example) may be implemented by the vehicle control ECU 10.

The vehicle control ECU 10 is connected to ECUs that control acceleration/deceleration of the host vehicle, that is to say, an engine control ECU 20 and a brake control ECU 22 via an appropriate bus such as a controller system CAN (controller area network), etc. It is noted that in the case of a hybrid vehicle and an electric vehicle, the vehicle control ECU 10 may be connected to an ECU that controls a motor (i.e., an inverter). Further, if a transmission is controlled by an ECU (transmission ECU) other than the engine control ECU 20, the transmission ECU may be connected to the vehicle control ECU 10.

During an ON state of an autonomous drive switch (not illustrated) that is operated by a user, the vehicle control ECU 10 determines, based on the preceding vehicle information from the forward radar sensor 16, host vehicle demand acceleration/deceleration (referred to as "demand acceleration/deceleration", hereinafter) G for an autonomous drive. At that time, the vehicle control ECU 10 may calculate the demand acceleration/deceleration G based on the preceding vehicle information from the forward radar sensor 16. It is noted that a way of calculating the demand acceleration/deceleration G is arbitrary. For example, the calculation way used in ACC (Adaptive Cruise Control) or the like may be used. For example, the demand acceleration/deceleration G may be determined such that an inter-vehicle distance between the preceding vehicle and the host vehicle becomes a predetermined target inter-vehicle distance, or an inter-vehicle time (=inter-vehicle distance/vehicle speed) between the preceding vehicle and the host vehicle becomes a predetermined target inter-vehicle time. In the latter case, the target inter-vehicle time may be set on a vehicle speed basis (vehicle speed of the host vehicle). Further, the target inter-vehicle time may be varied within a predetermined range set by the user. Further, if demand acceleration/deceleration of the preceding vehicle can be obtained via the inter-vehicle communication with the preceding vehicle, the demand acceleration/deceleration G may be calculated considering the demand acceleration/deceleration of the preceding vehicle. It is noted that, in the following, the demand acceleration/deceleration G represents "acceleration" when its value is positive, and "deceleration" when its value is negative. Further, the positive demand acceleration/deceleration G is also referred to as "demand acceleration G". The negative demand acceleration/deceleration G is also referred to as "demand deceleration G".

The vehicle control ECU 10 outputs a control target value based on the demand acceleration/deceleration G determined such as described above to the engine control ECU 20 and the brake control ECU 22. For example, the vehicle control ECU 10 outputs a target drive force based on the demand acceleration/deceleration G to the engine control ECU 20, or outputs a target brake force based on the demand acceleration/deceleration G to the brake control ECU 22. The engine control ECU 20 and the brake control ECU 22 control the engine and the brake apparatus such that such a control target value is implemented. For example, the engine control ECU 20 controls a fuel injection amount of the engine and/or a throttle position such that the target drive force is implemented, and the brake ECU controls brake actuators (not illustrated) such that the target brake force is implemented. It is noted that, in the case of the hybrid vehicle, an output of the motor, in addition to or instead of the output of the engine, may be controlled. Further, in the case of the electric vehicle, the output of the motor, instead of the output of the engine, may be controlled.

The vehicle control ECU 10 may be supplied with a variety of information such as accelerator pedal information, vehicle speed information, winker (blinker) information (i.e., information representing a turning state of turning lamps), if necessary.

The vehicle control ECU 10 performs an accelerator override determination based on the accelerator pedal information during the ON state of the autonomous drive switch. Specifically, the vehicle control ECU 10 calculates demand acceleration (referred to as "drive demand acceleration") according to the operation amount of the accelerator pedal by the driver. The vehicle control ECU 10 may set an accelerator override flag to its ON state when the drive demand acceleration exceeds the demand acceleration/deceleration G for the autonomous drive. The vehicle control ECU 10 may set the accelerator override flag to its OFF state when the drive demand acceleration is smaller than the demand acceleration/deceleration G for the autonomous drive. Alternatively, the accelerator override flag may be set to its ON state when the operation of the accelerator pedal by the driver is detected, for example, and may be set to its OFF state when the operation of the accelerator pedal is canceled. When the accelerator override flag is set to its ON state, the vehicle control ECU 10 outputs the control target value based on the drive demand acceleration to the engine control ECU 20 and the brake control ECU 22.

Figure 2:
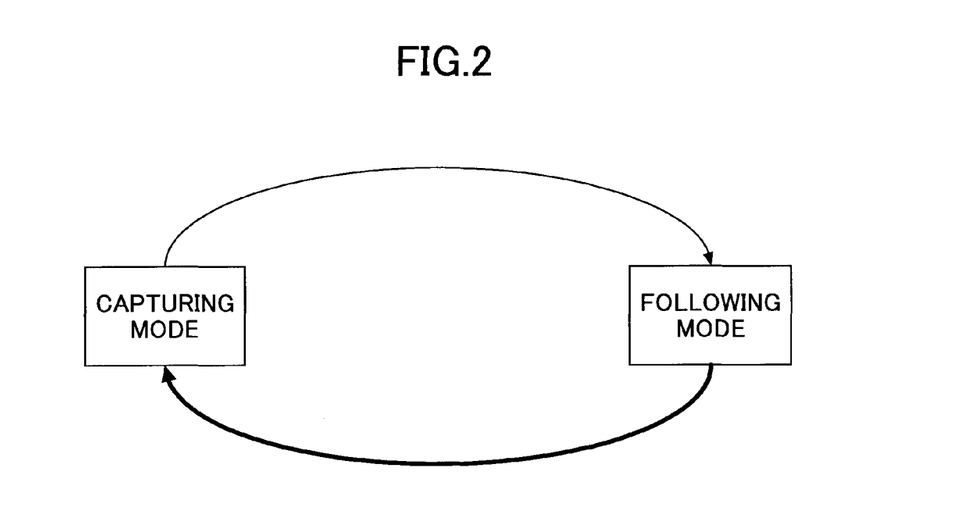
FIG. 2 is a diagram for illustrating an example of a mode transition manner according to a recognition state of a preceding vehicle according to a vehicle control ECU 10.

FIG. 2 is a diagram for illustrating an example of a mode transition manner according to a recognition state of a preceding vehicle according to a vehicle control ECU 10.

The vehicle control ECU 10 may operate in a capturing mode or a following mode according to a state of the preceding vehicle.

The capturing mode corresponds to a state in which no preceding vehicle to be followed by the host vehicle is captured. In the capturing mode, the vehicle control ECU 10 performs the process for identifying the preceding vehicle. Typically, the capturing mode is initially formed immediately after the autonomous drive switch is operated by the user to be turned on. Further, the capturing mode is formed in such predetermined cases where such a leaving event that the preceding vehicle moves to the neighboring lane, etc., occurs. It is noted that in the capturing mode the vehicle control ECU 10 may control the acceleration/deceleration of the host vehicle such that the vehicle speed is kept at a predetermined vehicle speed (a set vehicle speed set by the driver, a vehicle speed at the time of transition from the following mode, etc.).

The following mode corresponds to a state in which the preceding vehicle to be followed by the host vehicle is captured. In the following mode, the vehicle control ECU 10 controls the acceleration/deceleration of the host vehicle such that the host vehicle follows the preceding vehicle.

Figure 3:
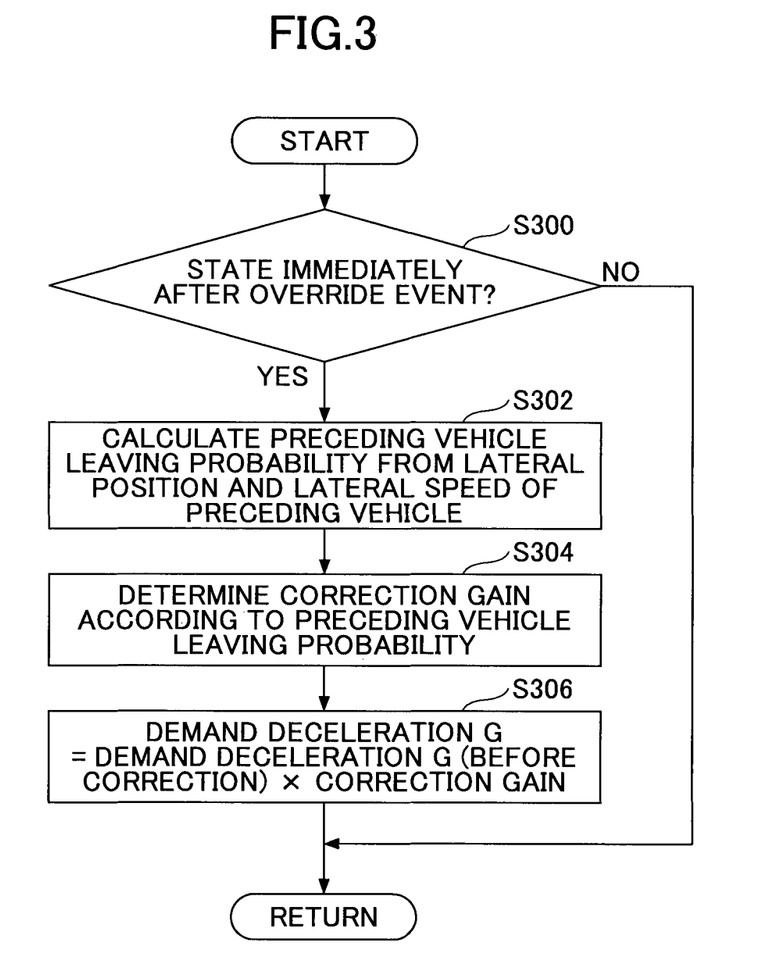
FIG. 3 is an example of a flowchart of a demand deceleration correction process executed by a vehicle control ECU 10.

FIG. 3 is an example of a flowchart of a demand deceleration correction process executed by the vehicle control ECU 10. The process routine illustrated in FIG. 3 may be performed repeatedly every predetermined cycle during the ON state of the autonomous drive switch and the operation in the following mode.

In step S300, the vehicle control ECU 10 determines whether the current control state is a state immediately after an override event. The state immediately after the override event may correspond to a state within a predetermined period after the accelerator override flag changes from the ON state to the OFF state. The predetermined period may be set in an arbitrary manner. If the current control state is the state immediately after an override event, the process routine goes to step S302. On the other hand, If the current control state is other than the state immediately after an override event (after the predetermined period has passed since accelerator override flag changed from the ON state to the OFF state), the process routine ends as it is. In this case, the demand acceleration/deceleration G for the autonomous drive is not subject to a correction according to the lateral position of the preceding vehicle, etc., described hereinafter.

In step S302, the vehicle control ECU 10 calculates the preceding vehicle leaving probability based on the lateral position and the lateral speed of the preceding vehicle. The preceding vehicle leaving probability represents a probability that the preceding vehicle is out of a state in which the preceding vehicle is to be a target to be followed (by the autonomous drive). For example, the preceding vehicle leaving probability represents a probability that the lateral position of the preceding vehicle is out of a predetermined lateral position range. The preceding vehicle leaving probability increases if it becomes inappropriate or difficult (or impossible) to continue the autonomous drive for following the preceding vehicle, such as a case where the preceding vehicle, which was followed, has changed its traveling lane to the neighboring lane, etc. If a state in which the preceding vehicle leaving probability exceeds a predetermined probability continues for a predetermined period, the preceding vehicle is no longer the target to be followed, and the capturing mode may be formed for capturing a new target to be followed.

A way of calculating the preceding vehicle leaving probability may be arbitrary as long as it is based on the lateral position and the lateral speed of the preceding vehicle. Further, the preceding vehicle leaving probability may be calculated based on any one of the lateral position and the lateral speed of the preceding vehicle. The lateral position and the lateral speed of the preceding vehicle may be based on the preceding vehicle information from the forward radar sensor 16. It is noted that the lateral position of the preceding vehicle corresponds to a position (distance) in the lateral direction with respect to the traveling direction (back-and-forth direction) of the host vehicle. The lateral speed of the preceding vehicle represents the change rate of the lateral position of the preceding vehicle in time series, and may be calculated based on history of the lateral position of the preceding vehicle. The lateral speed of the preceding vehicle may be calculated in the forward radar sensor 16 or the vehicle control ECU 10.

Typically, the preceding vehicle leaving probability may be calculated such that the preceding vehicle leaving probability becomes higher as the lateral position or the lateral speed of the preceding vehicle becomes greater. This because a probability that the traveling lane of the preceding vehicle is going to be (or has become) different from the traveling lane of the host vehicle becomes higher due to the lane change of the preceding vehicle or the host vehicle (the lane change at the time of passing), for example, as a lateral offset (i.e., the lateral position) with respect to the traveling direction of the host vehicle is greater. Further, this is because a probability that the change of the lateral position is not temporary and thus the traveling lane of the preceding vehicle is going to be (or has become) different from the traveling lane of the host vehicle becomes higher, as the lateral speed (in the direction in which the lateral position increases) is higher.

In step S304, the vehicle control ECU 10 determines a correction gain Rd according to the preceding vehicle leaving probability calculated in step S302. The correction gain Kd may be set such that the correction gain Kd becomes smaller (closer to 0) as the preceding vehicle leaving probability becomes higher. For example, the correction gain Kd may be set within a range from 0 to 1 such that the correction gain Kd becomes smaller as the preceding vehicle leaving probability becomes higher, such that the correction gain Kd is set to 0 or a value slightly greater than 0 when the preceding vehicle leaving probability is minimum, while the correction gain Kd is set to 1 when the identity index value is maximum, for example. It is noted that the relationship between the correction gain Kd and the preceding vehicle leaving probability may not be linear and thus may be non-linear.

In step S306, the vehicle control ECU 10 corrects the demand deceleration G with the correction gain Kd calculated in step S304. For example, the demand deceleration G may be corrected as follow.

demand deceleration $G$=demand deceleration $G$ (before the correction)×$Kd$

It is noted that the way of calculating the demand deceleration G (before the correction) is arbitrary, as described above. For example, the calculation way used in the ACC or the like may be used.

According to the process illustrated in FIG. 3, the demand deceleration G is corrected according to the preceding vehicle leaving probability in the state immediately after the accelerator override event. With this arrangement, the demand deceleration G is limited (corrected such that the magnitude thereof becomes smaller) if the preceding vehicle leaving probability is high, which enables the acceleration adapted for the intention of the driver who desires the acceleration. Thus, under a situation where the driver intentionally accelerates the host vehicle to cause the accelerator override event in order to pass the preceding vehicle involving the lane change, for example, if the preceding vehicle to be passed is still the target to be followed after the accelerator override event (if the accelerator pedal is released before the preceding vehicle to be passed becomes no longer the target to be followed, for example), the deceleration due to the preceding vehicle can be prevented. On the other hand, if the preceding vehicle leaving probability is low, the limitation on the demand deceleration G is suppressed, which enables appropriate deceleration according to the inter-vehicle time/distance with respect to the preceding vehicle. With this arrangement, it becomes possible to implement appropriate deceleration according to the inter-vehicle time/distance with respect to the preceding vehicle even in such situations where the host vehicle becomes closer to the preceding vehicle in spite of the preceding vehicle existing right in front of the host vehicle (i.e., the lateral position is nearly equal to 0) and thus the driver releases the accelerator pedal, the sudden interrupt of the neighboring vehicle during the accelerator override state causes driver to release the accelerator pedal (the preceding vehicle to be followed is changed due to the sudden interrupt of the neighboring vehicle), etc., for example.

It is noted that the process routine illustrated in FIG. 3 is executed in the state immediately after the override event; however, the processes of step S302 through step S306 may be executed even in a state other than the state immediately after the override event. In other words, the determination process of step S300 may be omitted. This is because the same state as the state immediately after the override event may be formed even in the case of the deceleration of the preceding vehicle, instead of such as an accelerator pedal operation of the driver that causes the accelerator override event. Specifically, for example, when the preceding vehicle to be followed decelerates, there may be a case where the driver of the host vehicle changes the driving lane with the operation of the steering wheel without the accelerator override event to pass (escape) the decelerating preceding vehicle. Also, in this case, by correcting the demand deceleration G according to the preceding vehicle leaving probability, the deceleration due to the preceding vehicle after the completion of the lane change, etc., can be prevented.

It is noted that, as described above, the process routine illustrated in FIG. 3 is executed during the operation in the following mode, and ends when the preceding vehicle becomes no longer the target to be followed. When the preceding vehicle becomes no longer the target to be followed, the demand deceleration G (before the correction) at that time is 0 as long as a new preceding vehicle does not exist as the preceding vehicle to be followed. A condition to be met when the preceding vehicle becomes no longer the target to be followed may be met in a case where a state in which the preceding vehicle leaving probability is greater than or equal to a predetermined value continues for a predetermined time, for example. In this case, the predetermined value may correspond to a "high" level described hereinafter. The predetermined time correspond to a time period necessary to determine that the leaving event of the preceding vehicle occurs with high accuracy, and may be adapted according to accuracy of the forward radar sensor 16, etc. Further, the predetermined time may be varied according to the preceding vehicle leaving probability at that time.

Figure 4:
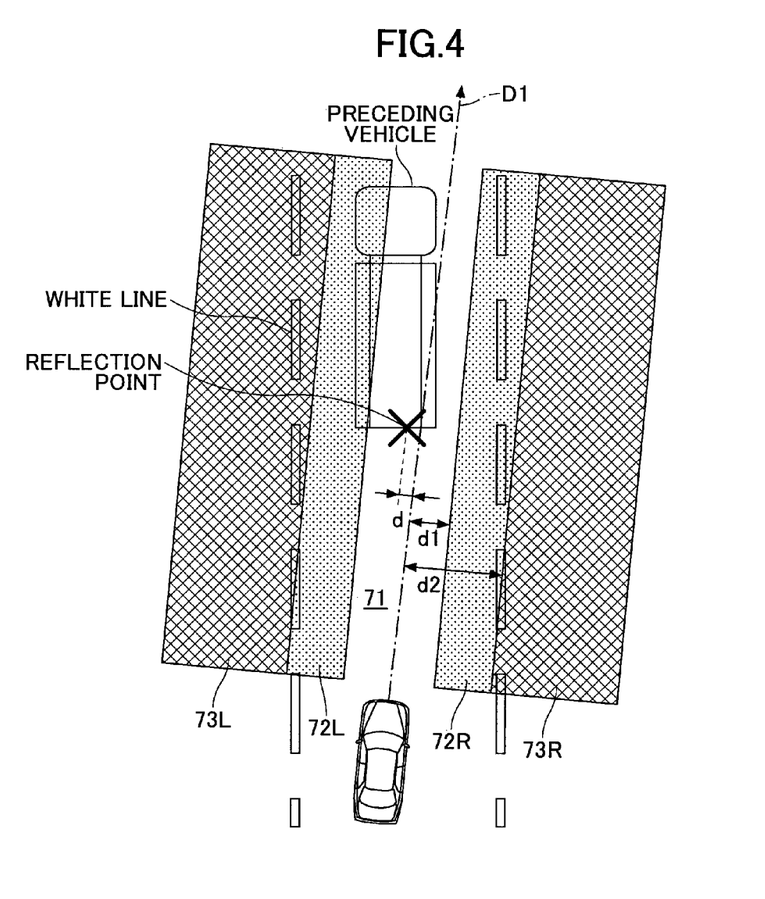
FIG. 4 is a plane view for schematically illustrating an example of regions used in calculating a preceding vehicle leaving probability.
Figure 5:
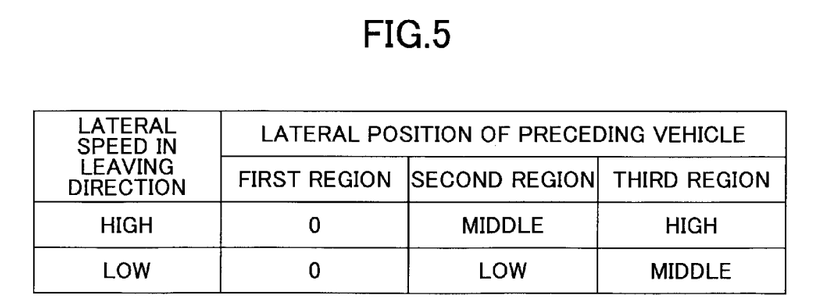
FIG. 5 is a diagram for schematically illustrating an example of a relationship between regions and the preceding vehicle leaving probability.

FIG. 4 and FIG. 5 are diagrams for explaining an example of calculating the preceding vehicle leaving probability. FIG. 4 is a plane view for schematically illustrating an example of regions used in calculating the preceding vehicle leaving probability. In the example illustrated in FIG. 4, a state in which the preceding vehicle (large-sized vehicle) to be followed travels in the same lane as the host vehicle is illustrated. The traveling direction D1 of the host vehicle is slightly inclined in the right direction (in a state in which the host vehicle starts the lane change in the right direction, for example), which causes the lateral position d of the preceding vehicle (i.e., the distance perpendicular to the traveling direction D1) to be greater than 0 regardless of the fact that the preceding vehicle and the host vehicle travel at the center of the lane. It is noted that, in FIG. 4, the lateral position d of the preceding vehicle (a reflection point detected by the forward radar sensor 16) is indicated by a mark "X".

In the example illustrated in FIG. 4, a first region 71 defined by the lateral position being smaller than a first predetermined value d1 in the left and right directions, second regions 72L and 72R defined by the lateral position being greater than or equal to the first predetermined value d1 and smaller than a second predetermined value d2, and third regions 73L and 73R defined by the lateral position being greater than or equal to the second predetermined value d2 are illustrated. The first predetermined value d1 corresponds to about a half of the width of the host vehicle, and may be slightly greater than the half of the width of the host vehicle. The second predetermined value d2 may correspond to about a half of the width (average width) of the lane.

It is noted that, in the example illustrated in FIG. 4, the respective regions (the first region 71, the second regions 72L and 72R and the third regions 73L and 73R) are illustrated such that they have lengths along the traveling direction of the host vehicle; however, the lengths of the regions (i.e., the inter-vehicle distance with respect to the preceding vehicle) may be considered or may not be considered in calculating the preceding vehicle leaving probability described hereinafter.

FIG. 5 is a diagram for illustrating an example of a relationship between the regions (the first region 71, the second regions 72L and 72R and the third regions 73L and 73R) and the preceding vehicle leaving probability.

In the example illustrated in FIG. 5, the preceding vehicle leaving probability is calculated as "0%" regardless of the lateral speed in the leaving direction (i.e., the direction in which the lateral position increases) when the lateral position of the preceding vehicle is within the first region 71. When the lateral position of the preceding vehicle is within the second region 72L or 72R, the preceding vehicle leaving probability is calculated as an "middle" level if the lateral speed in the leaving direction is relatively high, while the preceding vehicle leaving probability is calculated as a "low" level if the lateral speed in the leaving direction is relatively low. Further, when the lateral position of the preceding vehicle is within the third region 73L or 73R, the preceding vehicle leaving probability is calculated as a "high" level if the lateral speed in the leaving direction is relatively high, while the preceding vehicle leaving probability is calculated as a "middle" level if the lateral speed in the leaving direction is relatively low.

It is noted that whether the lateral speed in the leaving direction is relatively high or low may be determined using an arbitrary threshold. For example, the threshold may be a lower limit of a possible range of time required for the lane change at a lane with an average lane width (3.5 m, for example) or a value (middle value, for example) slightly greater than the lower limit, and may be adapted by experiments, etc.

According to the example illustrated in FIG. 4 and FIG. 5, by dividing the lateral range into three regions on opposite sides in the right and left directions, the preceding vehicle leaving probability can be evaluated with multiple steps. Thus, it becomes possible to change the suppression level for the deceleration according to the preceding vehicle leaving probability with three steps or more. Further, by considering the lateral speed in the leaving direction, the preceding vehicle leaving probability can be calculated with high accuracy.

It is noted that, in the example illustrated in FIG. 5, as a preferred embodiment, the lateral position and the lateral speed are considered to calculate the preceding vehicle leaving probability; however, as described above, only one of the lateral position and the lateral speed may be considered to calculate the preceding vehicle leaving probability. For example, if only the lateral position is considered to calculate the preceding vehicle leaving probability, the relationship between the regions (the first region 71, the second regions 72L and 72R and the third regions 73L and 73R) and the preceding vehicle leaving probability in FIG. 5, which is to be used in the case where the lateral speed in the leaving direction is relatively high, may be used, or the relationship between the regions and the preceding vehicle leaving probability in FIG. 5, which is to be used in the case where the lateral speed in the leaving direction is relatively low, may be used. Further, if only the lateral speed is considered to calculate the preceding vehicle leaving probability, the relationship between the lateral speed and the preceding vehicle leaving probability for the second regions 72L and 72 R (or the third regions 73L and 73 R) in FIG. 5 may be used.

Figure 6:
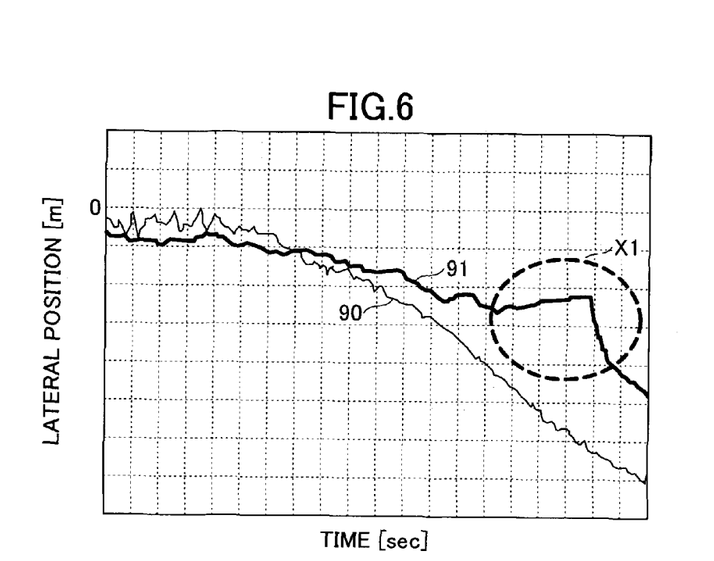
FIG. 6 is a diagram for illustrating an example of actual data of a lateral position of the preceding vehicle obtained from a forward radar sensor 16.

FIG. 6 is a diagram for illustrating an example of actual data of the lateral position of the preceding vehicle obtained from the forward radar sensor 16.

In FIG. 6, the lateral position of the preceding vehicle is illustrated in time series when the preceding vehicle changes its traveling lane under a situation where the host vehicle travels at the center of the lane. In FIG. 6, a curve 90 indicates an actual lateral position of the preceding vehicle in time series, and a curve 91 indicates the lateral position of the preceding vehicle in time series obtained from the forward radar sensor 16.

As illustrated in FIG. 6, the lateral position of the preceding vehicle obtained from the forward radar sensor 16 may change in an unstable manner due to a variation of the reflection point of the preceding vehicle in the lateral direction, etc. For example, as indicated by "X1", the lateral position, which should increase (i.e., increase gradually from 0), may start to decrease (toward 0). This means that there may be a case where the lateral position of the preceding vehicle is in the second region 72L even if the actual lateral position of the preceding vehicle is still in the third region 73L, after the lateral position of the preceding vehicle increases to enter the third region 73L, for example. In such a case, if the preceding vehicle leaving probability, which has been increased, is decreased accordingly, it results in the increase of the deceleration and thus the behavior against the intention of the driver (i.e., the driver feels that something is wrong).

For this reason, in order to consider such a tendency (fact) of the forward radar sensor 16, the preceding vehicle leaving probability (and thus the correction gain) may remain unchanged for a predetermined period $\Delta T1$ if the lateral position of the preceding vehicle starts to decrease from its increasing state. The predetermined period $\Delta T1$ may correspond to a time length in which such an unstable output as indicated by "X1" in FIG. 6 occurs, and may be adapted by the experiments, etc. With this arrangement, the undesired increase in the deceleration due to the unstable characteristics of the forward radar sensor 16 can be reduced, which can reduce the likelihood that the driver feels that something is wrong.

Figure 7:
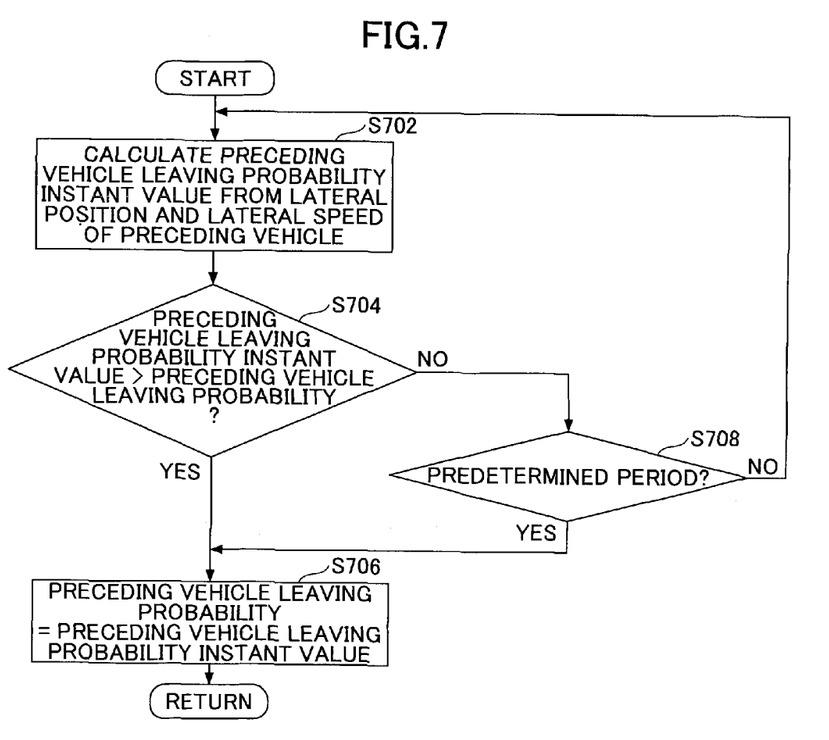
FIG. 7 is an example of a flowchart of a preceding vehicle leaving probability calculation process executed by the vehicle control ECU 10.

FIG. 7 is an example of a flowchart of a demand deceleration correction process executed by the vehicle control ECU 10. The process illustrated in FIG. 7 may be used as the preceding vehicle leaving probability calculation process of step 302 illustrated in FIG. 3.

In step S702, the vehicle control ECU 10 calculates an instant value (referred to as a "preceding vehicle leaving probability instant value") of the preceding vehicle leaving probability based on the lateral position and the lateral speed of the preceding vehicle. The preceding vehicle leaving probability instant value means a value of the preceding vehicle leaving probability calculated based on the current lateral position and the current lateral speed of the preceding vehicle, and thus does not necessarily correspond to the preceding vehicle leaving probability used for the control (described hereinafter). A way of calculating the preceding vehicle leaving probability instant value may be arbitrary as long as it is based on the lateral position and/or the lateral speed of the preceding vehicle. The way of calculating the preceding vehicle leaving probability instant value may be the same as the way of calculating the preceding vehicle leaving probability described above; however, an operation state of the driver may be considered to calculate the preceding vehicle leaving probability instant value as described hereinafter.

In step S704, the vehicle control ECU 10 determines whether the preceding vehicle leaving probability instant value calculated in step S702 at the current process cycle is greater than the currently stored preceding vehicle leaving probability. It is noted that, at the initial process cycle, the preceding vehicle leaving probability may be an initial value (0, for example). If the preceding vehicle leaving probability instant value is greater than the currently stored preceding vehicle leaving probability, the process goes to step S706, and otherwise the process goes to step S708.

In step S706, the vehicle control ECU 10 determines and stores (updates) the preceding vehicle leaving probability instant value calculated in step S702 at the current process cycle as the currently stored preceding vehicle leaving probability. In this case, at the next process cycle, the preceding vehicle leaving probability instant value calculated in step S702 at the current process cycle becomes the currently stored preceding vehicle leaving probability to be compared with the preceding vehicle leaving probability instant value calculated at the next process cycle.

In step S708, the vehicle control ECU 10 determines whether a state in which the preceding vehicle leaving probability instant value calculated in step S702 is less than or equal to the currently stored preceding vehicle leaving probability continues for the predetermined period ΔT1. If the state in which the preceding vehicle leaving probability instant value calculated in step S702 is less than or equal to the currently stored preceding vehicle leaving probability continues for the predetermined period ΔT1, the process routine goes to step S706. On the other hand, if the state does not continue for the predetermined period ΔT1, the currently stored preceding vehicle leaving probability is not changed to return to step S702. In this case, the preceding vehicle leaving probability instant value is calculated again at the next cycle.

According to the process illustrated in FIG. 7, when the preceding vehicle leaving probability instant value increases, the currently stored preceding vehicle leaving probability is immediately updated to be changed to the preceding vehicle leaving probability instant value. On the other hand, when the preceding vehicle leaving probability instant value decreases, the currently stored preceding vehicle leaving probability is not changed to the preceding vehicle leaving probability instant value unless this decreasing state continues for the predetermined period ΔT1. With this arrangement, as explained with reference to FIG. 6, the undesired increase in the deceleration due to the unstable characteristics of the forward radar sensor 16 can be reduced, which can reduce the likelihood that the driver feels that something is wrong.

It is noted that, in the process illustrated in FIG. 7, when the preceding vehicle leaving probability instant value is 0%, the process routine may go to step S706 regardless of the determination result in step S704. Further, in step S704, it is determined whether the preceding vehicle leaving probability instant value is greater than the currently stored preceding vehicle leaving probability; however, instead of it, it may be determined whether the preceding vehicle leaving probability instant value calculated at the current process cycle is greater than the preceding vehicle leaving probability instant value calculated at the previous process cycle. In this case, in step S708, it may be determined whether a state, in which the preceding vehicle leaving probability instant value increases, continues for the predetermined period ΔT1.

Figure 8:
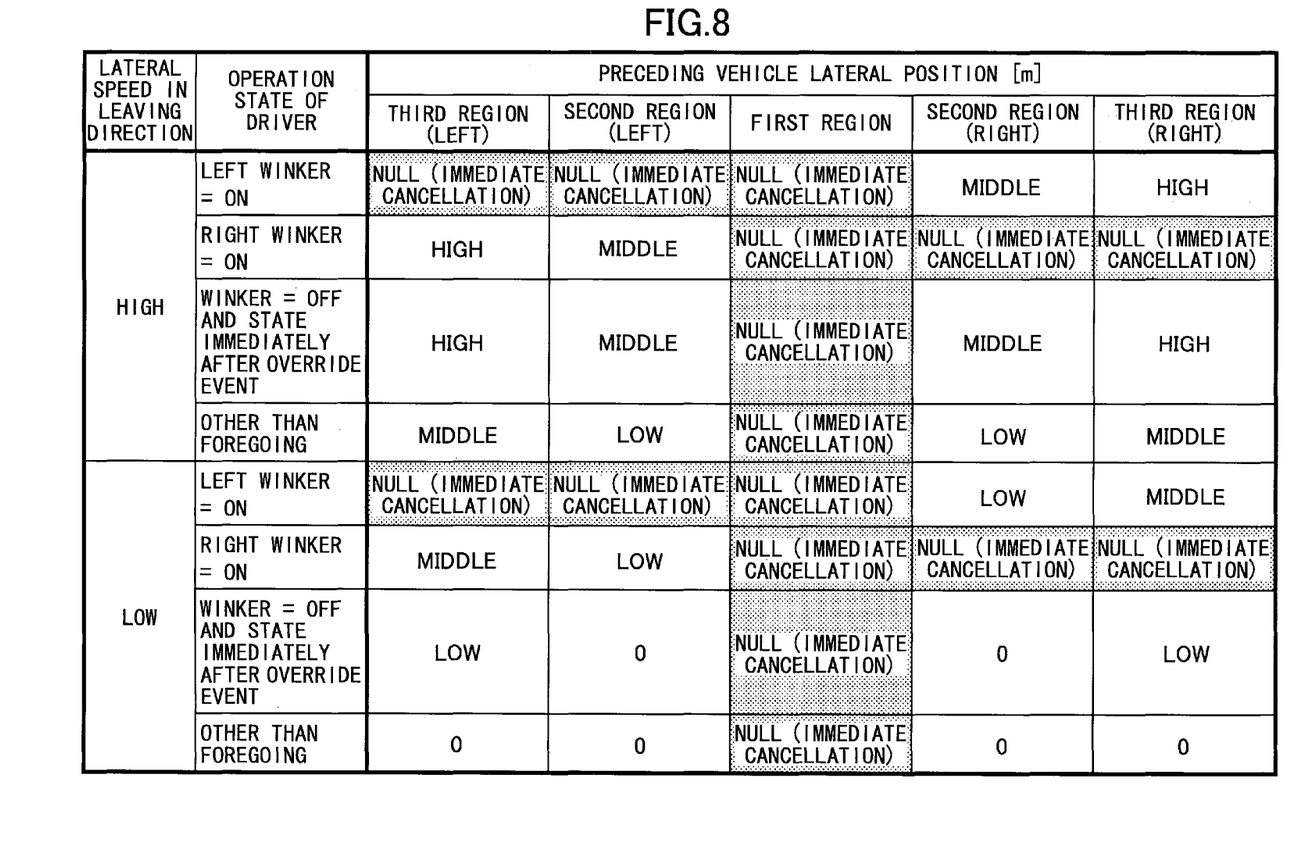
FIG. 8 is a diagram for illustrating an example of a way of calculating a preceding vehicle leaving probability instant value.

FIG. 8 is a diagram for illustrating an example of a way of calculating the preceding vehicle leaving probability instant value. The way of calculating the preceding vehicle leaving probability instant value illustrated in FIG. 8 may be used in step S702 in FIG. 7 described above.

The preceding vehicle leaving probability instant value may be determined based on the operation state of the driver in addition to the lateral position and the lateral speed of the preceding vehicle. In the example illustrated in FIG. 8, the operation state of the winker (winker lever) is considered. It is noted that typically the winker is provided at a steering column and is operated to flash left and right turning lamps.

In FIG. 8, a relationship between the regions (the first region 71, the second regions 72L and 72R and the third regions 73L and 73R) and the preceding vehicle leaving probability instant value is illustrated with respect to the operation state of the driver and the lateral speed (in the leaving direction) of the preceding vehicle. Concerning the preceding vehicle leaving probability instant value, "low" means a low level, "middle" means a middle level, "high" means a high level, and "0" means 0%. Further, the preceding vehicle leaving probability instant value "null (immediate cancellation)" means that the preceding vehicle leaving probability instant value is 0% and the preceding vehicle leaving probability is immediately changed to 0%. Thus, for example, in the process illustrated in FIG. 7, when the preceding vehicle leaving probability instant value is "null (immediate cancellation)", the process routine may go to step S706 regardless of the determination result in step S704. It is noted that, in the example illustrated in FIG. 8, when the lateral position of the preceding vehicle is within the first region 71, the preceding vehicle leaving probability instant value is always "null (immediate cancellation)". In the example illustrated in FIG. 8, with respect to the operation state of the driver, "left winker=ON" means a state where the winker operation for flashing the left turning lamp is performed. In this case, the second region 72L and the third region 73L are on the left side which is against the leaving direction, and thus the preceding vehicle leaving probability instant value is "null (immediate cancellation)" regardless of the lateral speed in the leaving direction. On the other hand, the second region 72R and the third region 73R are on the right side which corresponds to the leaving direction, and thus the preceding vehicle leaving probability instant values for the second region 72R and the third region 73R are "middle" and "high", respectively, when the lateral speed in the leaving direction is relatively high, and "low" and "middle", respectively, when the lateral speed in the leaving direction is relatively low.

Similarly, with respect to the operation state of the driver, "right winker=ON" means a state where the winker operation for flashing the right turning lamp is performed. In this case, the second region 72R and the third region 73R are on the right side which is against the leaving direction, and thus the preceding vehicle leaving probability instant value is "null (immediate cancellation)" regardless of the lateral speed in the leaving direction. On the other hand, the second region 72L and the third region 73L are on the left side which corresponds to the leaving direction, and thus the preceding vehicle leaving probability instant values for the second region 72L and the third region 73L are "middle" and "high", respectively, when the lateral speed in the leaving direction is relatively high, and "low" and "middle", respectively, when the lateral speed in the leaving direction is relatively low.

Further, with respect to the operation state of the driver, "right winker=OFF" means a state in which no winker operation for the left and right directions is performed. In this case, in the state immediately after the override event, the same relationship as illustrated in FIG. 5 may be used. However, in the example illustrated in FIG. 8, when the lateral speed in the leaving direction is relatively low, the preceding vehicle leaving probability instant value is "0" for the second regions 72L and 72R, and "low" for the third regions 73L and 73R.

Further, with respect to the operation state of the driver, "other than the foregoing" means a situation where no winker operation for the left and right directions is performed and the current state does not correspond to the state immediately after the override event. In this case, when the lateral speed in the leaving direction is relatively high, the preceding vehicle leaving probability instant value is "low" for the second regions 72L and 72R, and "middle" for the third regions 73L and 73R. On the other hand, when the lateral speed in the leaving direction is relatively low, the preceding vehicle leaving probability instant value is 0 for the second regions 72L and 72R and the third regions 73L and 73R.

According to the calculation way of the preceding vehicle leaving probability instant value, the operation state of the driver is considered, which increases the accuracy of the preceding vehicle leaving probability instant value. For example, by considering the state of the winker operation, the accuracy of the preceding vehicle leaving probability instant value can be increased at the time of the leaving event involving the lane change of the host vehicle.

It is noted that, in the example illustrated in FIG. 8, a state of the steering operation (a steering angle, a steering direction, etc.) may be used, instead of or in addition to the state of the winker operation. In this case, for example, "right winker=ON" may correspond to a state where the steering angle in the right direction is greater than or equal to a predetermined angle, and "left winker=ON" may correspond to a state where the steering angle in the left direction is greater than or equal to a predetermined angle. However, the state of the steering operation may not be considered during the travel on a curved road, for example. In this case, the travel on the curved road may be detected based on a navigation apparatus and a measurement result of a GPS (Global Positioning System) receiver, or based on a white line recognition result by an image sensor.

Figure 9:
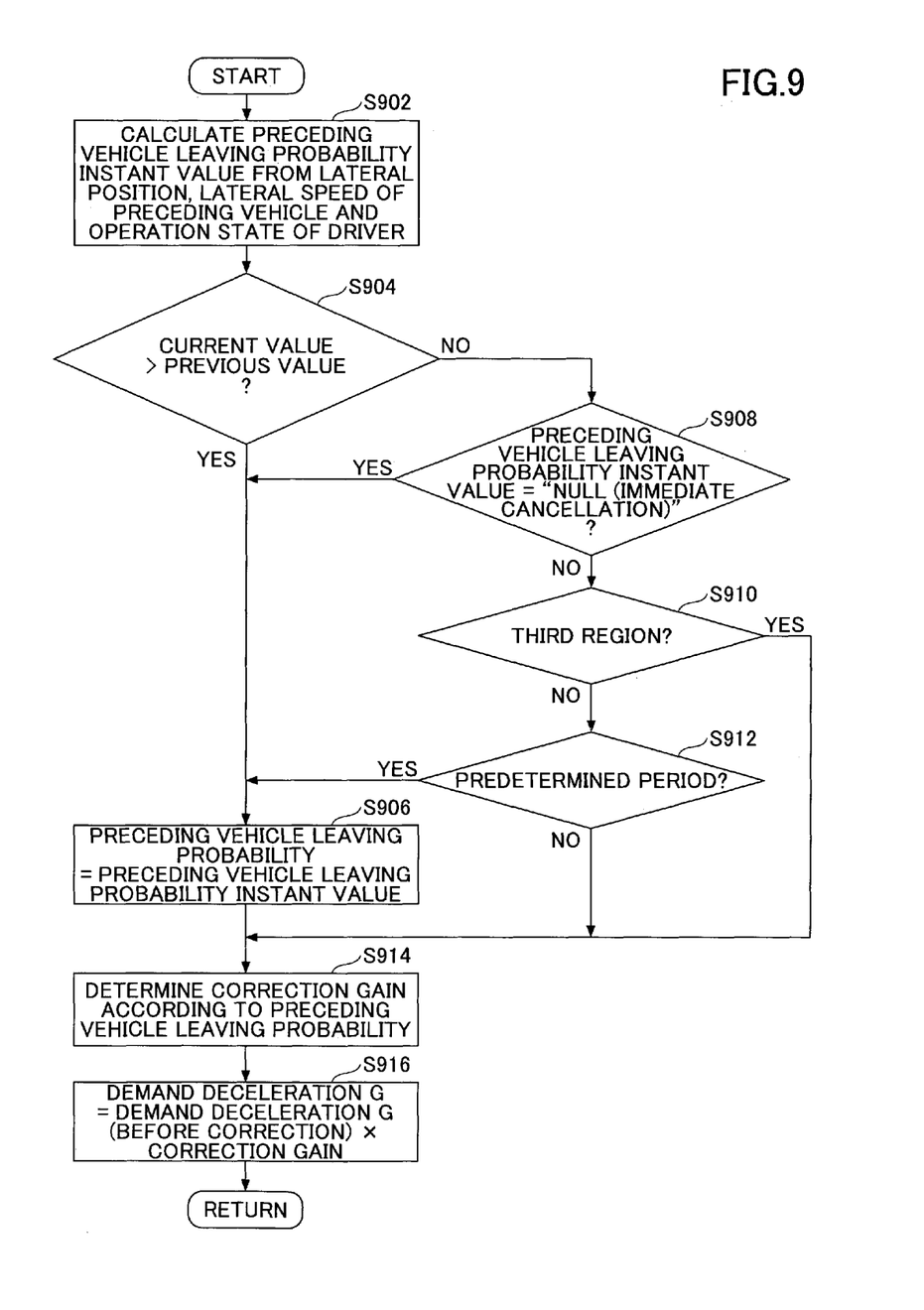
FIG. 9 is another example of a flowchart of the demand deceleration correction process executed by the vehicle control ECU 10.

FIG. 9 is another example of a flowchart of the demand deceleration correction process executed by the vehicle control ECU 10. The process routine illustrated in FIG. 9 may be performed repeatedly every predetermined cycle during the ON state of the autonomous drive switch and the operation in the following mode.

In step S902, the vehicle control. ECU 10 calculates the preceding vehicle leaving probability instant value based on the lateral position of the preceding vehicle, the lateral speed of the preceding vehicle and the operation state of the driver (accelerator pedal information, winker information, etc.). For this calculation, the calculation way of the preceding vehicle leaving probability instant value illustrated in FIG. 8 may be used.

In step S904, the vehicle control ECU 10 determines whether the preceding vehicle leaving probability instant value calculated in step S902 is greater than the currently stored preceding vehicle leaving probability. It is noted that, at the initial process cycle, the preceding vehicle leaving probability may be an initial value (0, for example). If the preceding vehicle leaving probability instant value is greater than the currently stored preceding vehicle leaving probability, the process goes to step S906, and otherwise the process goes to step S908.

In step S906, the vehicle control ECU 10 determines the preceding vehicle leaving probability instant value calculated in step S902 as the preceding vehicle leaving probability. In this case, at the next process cycle, the preceding vehicle leaving probability instant value calculated in step S902 at the current process cycle becomes the currently stored preceding vehicle leaving probability to be compared with the preceding vehicle leaving probability instant value calculated at the next process cycle.

In step S908, the vehicle control ECU 10 determines whether the preceding vehicle leaving probability instant value calculated in step S902 is "null (immediate cancellation)". If the preceding vehicle leaving probability instant value is "null (immediate cancellation)", the process goes to step S906, and otherwise the process goes to step S910. Thus, if the preceding vehicle leaving probability instant value calculated in step S902 is "null (immediate cancellation)", the preceding vehicle leaving probability instant value is immediately changed to 0%.

In step S910, the vehicle control ECU 10 determines whether the lateral position of the preceding vehicle is within the third region 73L or 73R. If the lateral position of the preceding vehicle is within the third region 73L or 73R, the currently stored preceding vehicle leaving probability is not changed and the process routine goes to step S914. On the other hand, if the lateral position of the preceding vehicle is within the third region 73L or 73R (i.e., the lateral position of the preceding vehicle is within the second region 72L or 72R), the process routine goes to step S912.

In step S912, the vehicle control ECU 10 determines whether a state continues for the predetermined period ΔT1. Specifically, the vehicle control ECU 10 determines whether a state, in which the preceding vehicle leaving probability instant value calculated in step S902 is less than or equal to the currently stored preceding vehicle leaving probability, the preceding vehicle leaving probability instant value calculated in step S902 is not "null (immediate cancellation)", and the lateral position of the preceding vehicle is not within the third region 73L or 73R, continues for the predetermined period ΔT1. If the state continues for the predetermined period ΔT1, the process routine goes to step S906. On the other hand, if the state does not continue for the predetermined period ΔT1, the process routine goes to step S914 without changing the currently stored preceding vehicle leaving probability.

In step S914, the vehicle control ECU 10 determines the correction gain Kd according to the currently stored preceding vehicle leaving probability. The correction gain Kd may be set such that the correction gain Kd becomes smaller as the preceding vehicle leaving probability becomes higher, as is the case with step S304. It is noted that the relationship between the correction gain Kd and the preceding vehicle leaving probability may not be linear and thus may be non-linear.

In step S916, the vehicle control ECU 10 corrects the demand deceleration G with the correction gain Kd calculated in step S914. For example, the demand deceleration G may be corrected as is the case with step S306.

According to the process illustrated in FIG. 9, the following effects can be obtained in addition to the effects obtained by the process illustrated in FIG. 3. According to the process illustrated in FIG. 9, as the process illustrated in FIG. 7, when the preceding vehicle leaving probability instant value increases, the preceding vehicle leaving probability is immediately changed to the preceding vehicle leaving probability instant value. On the other hand, when the preceding vehicle leaving probability instant value decreases, the preceding vehicle leaving probability is not changed to the preceding vehicle leaving probability instant value unless this decreasing state continues for the predetermined period ΔT1 except for particular cases. With this arrangement, as explained with reference to FIG. 6, the undesired increase in the deceleration due to the unstable characteristics of the forward radar sensor 16 can be reduced, which can reduce the likelihood that the driver feels that something is wrong. On the other hand, as the particular cases, if the preceding vehicle leaving probability instant value is "null (immediate cancellation)", the preceding vehicle leaving probability is immediately changed to the preceding vehicle leaving probability instant value, which enables appropriate deceleration according to the inter-vehicle time/distance with respect to the preceding vehicle. Further, as the particular cases, if the lateral position is within the third region 73L or 73R, the preceding vehicle leaving probability is not changed, which enables the increase in the deceleration due to the cancellation of the operation of the winker, for example. Specifically, for example, if the host vehicle changes the traveling lane to the right neighboring lane with the winker operation by the driver for flashing the right turning lamp, the preceding vehicle leaving probability instant value is high when the lateral position of the preceding vehicle is within the third region 73L, but after that, when the winker for the right turning lamp is turned off, the preceding vehicle leaving probability instant value becomes "middle" even though the lateral position of the preceding vehicle is still within the third region 73L (see FIG. 8). In such a case, because the preceding vehicle leaving probability "high" remains unchanged, the increase in the deceleration due to such a cancellation of the winker operation can be prevented. This is advantageous for drivers who turn off the winker relatively early in changing the lane.

It is noted that, according to the process illustrated in FIG. 9, in step S904, it is determined whether the preceding vehicle leaving probability instant value calculated at the current process cycle is greater than the currently stored preceding vehicle leaving probability; however, instead of it, it may be determined whether the preceding vehicle leaving probability instant value calculated at the current process cycle is greater than the preceding vehicle leaving probability instant value calculated at the previous process cycle. In this case, in step S912, the vehicle control ECU 10 may determine whether a state, in which the preceding vehicle leaving probability instant value calculated at the current process cycle is less than or equal to the preceding vehicle leaving probability instant value calculated at the previous process cycle, the preceding vehicle leaving probability instant value is not "null (immediate cancellation)", and the lateral position of the preceding vehicle is not within the third region 73L or 73R, continues for the predetermined period ΔT1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiment described above, the demand deceleration G is corrected with the correction gain Kd; however, the demand deceleration G may be directly calculated based on the preceding vehicle leaving probability and a parameter (the inter-vehicle distance, for example) used in calculating the demand deceleration G such that the preceding vehicle leaving probability affects the calculated demand deceleration G. In this case, as a result, such a calculation way is equivalent to "correcting" the demand deceleration G.

Further, in the embodiment described above, the correction is implemented by multiplying the demand deceleration G (before the correction) by the correction gain Kd; however, the correction may be implemented by adding or subtracting the correction gain Kd to or from the demand deceleration G (before the correction). In this case, the correction amount may be determined based on the same idea as the idea used in determining the correction gain Kd.

Further, in the embodiment described above, three regions (five regions if considering the left and right sides separately) of the first region 71, the second regions 72L and 72R and the third regions 73L and 73R are used; however, the number of the regions is arbitrary. For example, the second region 72L and the third region 73L may be unified as a single region, and the second region 72R and the third region 73R may be unified as a single region.

Further, in the embodiment described above, the lateral position of the preceding vehicle, etc., with respect to the traveling direction of the host vehicle are considered; however, at that time, traveling direction of the host vehicle may correspond to a direction that extends in the back-and-forth direction from the center of the host vehicle in the left and right directions, or a direction that corresponds to the extending direction of the traveling lane of the host vehicle. In the latter case, the lateral position of the preceding vehicle, etc., with respect to the traveling direction of the host vehicle corresponds to the lateral position of the preceding vehicle, etc., with respect to a lane boundary sign such as a white line, etc. The lateral position of the preceding vehicle, etc., with respect to a lane boundary sign can be calculated based on a white line recognition result by an image sensor. In this case, a relationship between the lateral position of the host vehicle, etc., with respect to the lane boundary sign related to the traveling lane of the host vehicle and the lateral position of the preceding vehicle, etc., with respect to the same lane boundary sign may be considered.

The present application is based on Japanese Priority Application No. 2013-185685, filed on Sep. 6, 2013, the entire contents of which are hereby incorporated by reference.

The invention claimed is:
1. A vehicle travel control apparatus, comprising:
a sensor that obtains preceding vehicle speed information representing a vehicle speed of a preceding vehicle, and preceding vehicle information representing at least one of (i) a lateral distance of the preceding vehicle that is measured in a direction that is perpendicular to a traveling direction of a host vehicle from a point falling on an imaginary line that passes through the host vehicle and is parallel to the traveling direction of the host vehicle and (ii) a lateral speed of the preceding vehicle in the direction that is perpendicular to the traveling direction; and
a controller that, during a following mode in which the host vehicle follows the preceding vehicle, determines a target value related to acceleration/deceleration of the host vehicle based on the preceding vehicle speed information such that the host vehicle follows the preceding vehicle, and controls the acceleration/deceleration of the host vehicle such that the target value is implemented, wherein
the controller calculates, based on an operation state of a winker by a driver and the preceding vehicle information, a preceding vehicle leaving probability indicative of a probability that the preceding vehicle is out of a state in which the preceding vehicle is to be followed,
during the following mode, the controller suppresses control of the acceleration/deceleration in response to a first predetermined accelerator operation being detected, and cancels suppression of the control of the acceleration/deceleration in response to a second predetermined accelerator operation, having an operation amount less than an operation amount of the first predetermined accelerator operation, being detected,
the controller corrects the target value related to the acceleration/deceleration of the host vehicle based on the preceding vehicle leaving probability only in a state immediately after canceling the suppression of the control of the acceleration/deceleration, and suppressing control of the acceleration/deceleration includes setting an accelerator pedal override state where the controller overrides the target value with a driver demand acceleration calculated based upon the first predetermined accelerator operation.

2. The vehicle travel control apparatus of claim 1, wherein the controller calculates the preceding vehicle leaving probability such that a magnitude of the preceding vehicle leaving probability becomes higher as the lateral distance or the lateral speed of the preceding vehicle becomes greater.

3. The vehicle travel control apparatus of claim 1, wherein the controller limits a change in the preceding vehicle leaving probability for a predetermined period when the lateral distance or the lateral speed of the preceding vehicle starts to decrease from its increasing state.

4. The vehicle travel control apparatus of claim 1, wherein the controller limits a change in a correction amount of the target value for a predetermined period when the lateral distance or the lateral speed of the preceding vehicle starts to decrease from its increasing state.

5. The vehicle travel control apparatus of claim 1, wherein the preceding vehicle leaving probability is calculated such that the preceding vehicle leaving probability in the case where the winker is operated in such a direction that corresponds to a direction in which the lateral distance from the traveling direction or the lateral speed of the preceding vehicle increases is smaller than that in the case where the winker is operated in such a direction that corresponds to a direction in which the lateral distance from the traveling direction or the lateral speed of the preceding vehicle decreases.

6. The vehicle travel control apparatus of claim 1, wherein
 the target value related to the acceleration/deceleration of the host vehicle is calculated by multiplying a target value of the deceleration by a correction gain, the target value of the deceleration being calculated based on the preceding vehicle speed information, and
 the correction gain is calculated such that the correction gain becomes smaller as the preceding vehicle leaving probability becomes higher.

7. The vehicle control apparatus of claim 1, wherein the preceding vehicle information represents both of the lateral distance and the lateral speed of the preceding vehicle.

* * * * *